United States Patent
Aggarwal et al.

(10) Patent No.: US 7,929,017 B2
(45) Date of Patent: Apr. 19, 2011

(54) METHOD AND APPARATUS FOR STEREO, MULTI-CAMERA TRACKING AND RF AND VIDEO TRACK FUSION

(75) Inventors: Manoj Aggarwal, Lawrenceville, NJ (US); Harpreet Sawhney, West Windsor, NJ (US); Keith Hanna, Princeton Junction, NJ (US); Rakesh Kumar, Monmouth Junction, NJ (US); Tao Zhao, Plainsboro, NJ (US); David R. Patterson, Yardley, PA (US); David Kalokitis, Robbinsville, NJ (US)

(73) Assignee: SRI International, Menlo Park, CA (US)

( * ) Notice: Subject to any disclaimer, the term of this patent is extended or adjusted under 35 U.S.C. 154(b) by 1579 days.

(21) Appl. No.: 11/192,682

(22) Filed: Jul. 28, 2005

(65) Prior Publication Data
US 2006/0028552 A1 Feb. 9, 2006

Related U.S. Application Data

(60) Provisional application No. 60/592,206, filed on Jul. 28, 2004.

(51) Int. Cl.
*H04N 5/225* (2006.01)
(52) U.S. Cl. ...................................................... 348/169
(58) Field of Classification Search ........................ None
See application file for complete search history.

(56) References Cited

U.S. PATENT DOCUMENTS

| | | | | |
|---|---|---|---|---|
| 6,359,647 | B1* | 3/2002 | Sengupta et al. | 348/154 |
| 6,993,378 | B2* | 1/2006 | Wiederhold et al. | 600/509 |
| 7,151,454 | B2* | 12/2006 | Washington | 340/572.1 |
| 7,240,007 | B2* | 7/2007 | Junqua et al. | 704/273 |

OTHER PUBLICATIONS

D. Beymer, Person Counting Using Stereo, *Proc. IEEE Workshop on Human Motion*, 2000.
H. Tao, H.S. Sawhney and R. Kumar, Object Tracking with Bayesian Estimation of Dynamic Layer Representations, *IEEE Trans. on PAMI*, 24(1):75-89, 2002.
M. Harville and D. Li, Fast Integrated Person Tracking and Activity Recognition with Plan-View Templates form a Single Stero Camera, *Proc. IEEE Conf. CVPR*, 2004.

(Continued)

*Primary Examiner* — Nhon T Diep
(74) *Attorney, Agent, or Firm* — Lowenstein Sandler PC

(57) ABSTRACT

A unified approach, a fusion technique, a space-time constraint, a methodology, and system architecture are provided. The unified approach is to fuse the outputs of monocular and stereo video trackers, RFID and localization systems and biometric identification systems. The fusion technique is provided that is based on the transformation of the sensory information from heterogeneous sources into a common coordinate system with rigorous uncertainties analysis to account for various sensor noises and ambiguities. The space-time constraint is used to fuse different sensor using the location and velocity information. Advantages include the ability to continuously track multiple humans with their identities in a large area. The methodology is general so that other sensors can be incorporated into the system. The system architecture is provided for the underlying real-time processing of the sensors.

20 Claims, 10 Drawing Sheets

OTHER PUBLICATIONS

T. Zhao and R. Nevaytia, Tracking Multiple Humans in Complex Situations, *IEEE Trans. PAMI*, 26(9):1208-1221, 2004.

H. Pasula, S. Russell, M. Ostland and Y. Ritov, Tracking many objects with many sensors, *Proc. IJCAI*, 1999.

O. Javed, Z. Rasheed, K. Shafique and M. Shah, Tracking Across Multiple Cameras With Disjoint Views, *Proc. ICCV*, 2003.

H. Tao, H.S. Sawhney, R. Kumar, Dynamic Layer Representation with Applications to Tracking, *IEEE Computer Society Conference on Computer Vision and Pattern Recognition (CVPR)*, 02(2):2134, 2000.

D. Beymer and Konolige K. Tracking people from a mobile platform. *In IJCAI*, 2001.

* cited by examiner

Tracking Examples (Video)

METHOD AND APPARATUS FOR STEREO, MULTI-CAMERA TRACKING AND RF AND VIDEO TRACK FUSION

CROSS-REFERENCE TO RELATED APPLICATIONS

This application claims the benefit of U.S. Provisional Application No. 60/592,206 filed on Jul. 28, 2004, which is herein incorporated by reference.

GOVERNMENT RIGHTS IN THIS INVENTION

This invention was made with U.S. government support under contract numbers N61339-03-C-0122 and NMA401-02-9-2001-0023. The U.S. government has certain rights in this invention.

BACKGROUND OF THE INVENTION

1. Field of the Invention

The invention relates generally to video systems and computer systems. More specifically, the invention relates to multi-camera tracking and radio frequency (RF) and video track fusion.

2. Description of the Related Art

Many important applications, such as visual surveillance, intelligent living environments, and human behavior analysis require locating moving objects and determining their identities in a physical environment. The advances in computer vision and sensor technology have resulted in sensors that provide related information. For example, video-based trackers report 2D or 3D object positions, radio frequency identification (RFID) and localization systems report 3D object positions, biometric sensors report identities of the objects (e.g., humans). However, a single sensor usually has a limited coverage and provides limited information.

Fusion of heterogeneous sensors is needed to present all the information in a compact and coherent way, both to human users and to automatic processing modules. There is a need for a system that fuses multiple sensors to enable continuous tracking of people and their identities over a wide area. This would be much more powerful than the information available from a single sensor.

SUMMARY OF THE DISCLOSURE

Various deficiencies of the prior art are addressed by various exemplary embodiments of the present invention of a method and apparatus for stereo, multi-camera tracking and RF and video track fusion.

One embodiment is a method for tracking an object. A number of camera trackers receive camera video streams from a plurality of cameras. The camera trackers provide camera video tracks. One or more radio frequency identification (RFID) and localization system(s) provide RF tracks and RF identities. A fusion module selectively fuses the camera video tracks with the RF tracks to generate fused tracks. The fusion module associates the fused tracks with the RF identities. A visualization display displays the fused tracks and the RF identities and provides access to time-synchronized camera videos. Another embodiment is a computer readable medium having stored thereon instructions for performing this method.

Another embodiment is a system for tracking an object, including a number of camera trackers, one or more radio frequency identification (RFID) and localization system(s), a fusion module, and a visualization display. The camera trackers receive camera video streams from cameras and provide camera video tracks. The RFID and localization system provides RF tracks and RF identities. The fusion module selectively fuses the camera video tracks with the RF tracks to generate fused tracks and associates the fused tracks with the RF identities. The visualization display displays the fused tracks and the RF identities and provides time-synchronized access to the camera videos.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
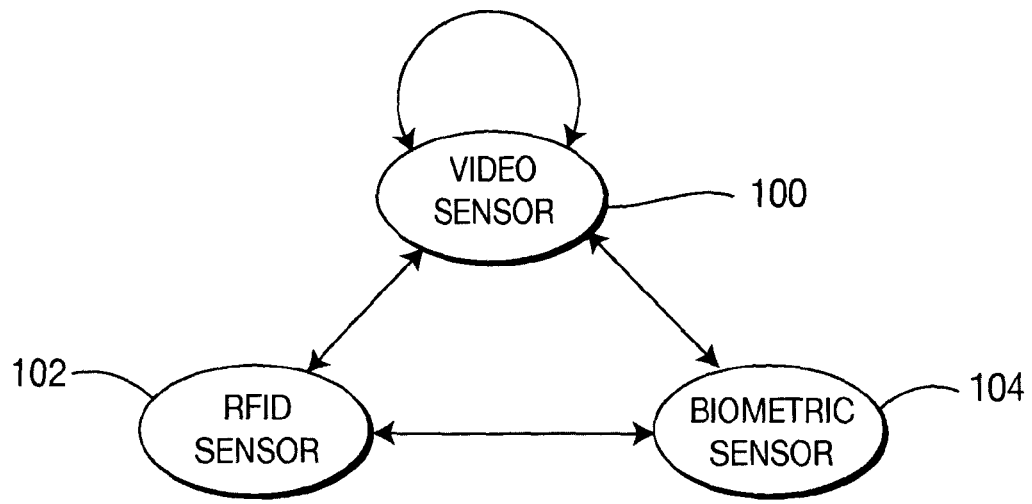
FIG. 1 is a flow chart illustrating an exemplary fusion of different types of sensors.

FIG. 1 illustrates an exemplary fusion of different types of sensors. Exemplary embodiments of the present invention provide fusion of different types of sensors and enable many interesting capabilities. For example, fusion may be performed using video sensors 100, RFID sensors 102, and biometric sensors 104. Video-video fusion extends the effective coverage of a single camera. Video-video fusion reports a single global track for a human moving in an area covered by a network of cameras. Video-video fusion enables analyzing the interesting behavior of a human in a larger spatial and temporal domain than possible in the past. Video-RF fusion is an advance over RF tracks alone, which only provide gross location information. When an RF track is fused with one or multiple video tracks, the video tracks provide detailed visual information. With video-RF fusion, a selective video-based alarm ignores the alarms by certain RFID tag wearers with special authorization. RFID fills in the video sensor gaps without losing the identities of the humans. Video-biometric fusion is fusing biometric sensor reports with video tracks so that the identities of the entire video tracks are available. The identities are carried by the video tracks as the human moves in the covered area (e.g., a wide area for video-video fusion). In this way, the biometric information is available not only at the instants of identification, but at all times. Biometric-RF fusion enables detection of events such as a stolen RFID tag.

Exemplary embodiments include a unified approach, a fusion technique, a space-time constraint, a methodology, and system architecture. The unified approach is to fuse the outputs of monocular and stereo video trackers, RFID and localization systems and biometric identification systems. A fusion technique is provided that is based on the transformation of the sensory information from heterogeneous sources into a common coordinate system with rigorous uncertainties analysis to account for various sensor noises and ambiguities. The space-time constraint is used to fuse different sensor using the location and velocity information. Advantages include the ability to continuously track multiple humans with their identities in a large area. The methodology is general so that other sensors can be incorporated into the system. The system architecture is provided for the underlying real-time processing of the sensors.

Sensors

Figure 2:
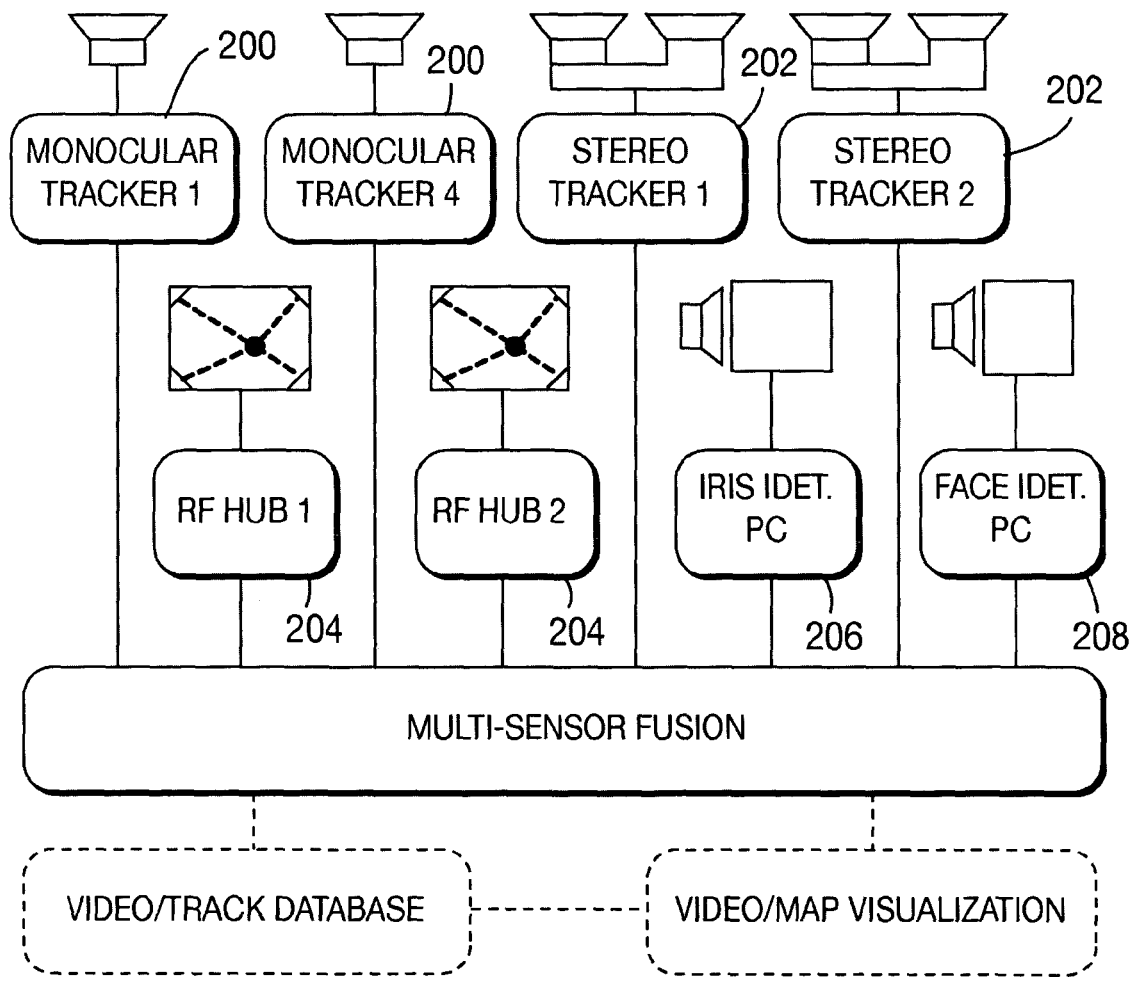
FIG. 2 is a block diagram illustrating an exemplary fusion system.

FIG. 2 illustrates an exemplary fusion system in which sensor processing is performed on different platforms that communicate to a fusion module via Ethernet. Exemplary embodiments use various sensors, such as monocular camera trackers 200, stereo camera trackers 202, RFID and localization systems 204, iris identification systems 206, and face identification systems 208.

In an exemplary embodiment of the system, room A is equipped with four monocular cameras and room B with two stereo cameras. Also, an RFID and localization system is installed in each room. An iris identification sensor is placed in room B and a face identification sensor is placed in room A. In another exemplary embodiment, 12 stereo cameras are installed. One embodiment has two monocular trackers running on a personal computer (PC) and has one stereo tracker running on another PC. RF receivers are connected to their hubs. The iris sensor is connected to its processing PC. The face sensor is connected to its processing PCs. All the PCs are time-synchronized using a network service. All of the PCs export results through Ethernet connections using network protocols to the receivers on the PC that performs the fusion. The exemplary system also includes both video and track databases by which the user may see live or replayed video and track and perform queries.

In one exemplary embodiment, the system continuously tracks humans in the covered area between two rooms. The system is able to hand off an object between a mixture of stereo and monocular cameras. (See FIG. 6.) The number of cameras and their locations are transparent to the system user. It appears as if there was only one single sensor that covers the entire area. The fusion is more accurate where the uncertainties of the ground measurements are small. In both rooms, the handoff accuracy is better in the center of the room than at the far ends. To ensure fusion performance, the cameras are placed so that the ground uncertainty is bounded by some threshold at the overlapped areas of two adjacent cameras.

In this exemplary embodiment, the video tracks of a person wearing an RFID tag are fused with his RF tracks. The RF localization system is able to bridge the gap of video cameras that do not overlap so that the area has continuous coverage. When fusing with RF tracks, video tracks are associated despite any gap. When a person performs a biometric identification, the future video tracks as well as previous video tracks associated with the person are labeled with the identity of the person (e.g., name). By video-video fusion, the identity of the person is carried into the coverage of the other cameras within the network.

A monocular video sensor detects moving objects using change detection. The change detection is performed on images filtered by Laplacian kernels instead of raw intensity images. This approach is insensitive to the illumination changes (both global illumination change and object shadows) while being sensitive to moving objects. Image analysis is performed on the moving foreground to detect objects of interest based on their shape (e.g., a human) and motion (e.g., consistent motion, instead of random motion such as tree leaves swaying in the wind). Once objects are detected, they are tracked using a layer-based multi-object tracker. The layer-based tracker avoids the joint object state space when there are multiple overlapping objects by introducing the concept of ownership (i.e., which object (or background) does a pixel belong to). The object ownership and its position are estimated iteratively through an expectation and maximization (EM) algorithm. The layer-tracking framework also integrates multiple cues (e.g., appearance, shape, and motion) of an object. The monocular video tracker outputs the location (e.g., a bounding box and the location of the head) of each human object in its view. Cameras are calibrated with respect to the world coordinate system.

A pair of stereo cameras is used to compute the scene depth. Depth information is complementary to the appearance information from a monocular camera. The depth information relates well to the structure of the physical world. The foreground pixels are extracted by joint appearance and depth based change detection. The foreground pixels are converted into 3D points and are further segmented into multiple humans using a plan-view based segmentation approach. The system advantageously segments multiple people moving closely in a group, while discarding any illumination or non-physical changes. The detected humans are tracked using a layer-based tracker with augmented object state for the depth. The depth information is used to discriminate the objects that are far away from each other in 3D but close to each other in the image due to camera projection. In addition to the outputs as in the monocular tracker, the stereo tracker outputs the location of each object on the ground plane.

An exemplary RF tracking system provides around half meter accuracy in places where an RFID tag is seen by three or more receivers. The RFID and localization system supports a frame rate of up to 15 Hz. At each frame, the x-y location (in an RFID local coordinate system that is aligned with the ground) is reported for each track in the covered area. There are three types of reports: presence, 2D point, and 3D point, which correspond to the cases where a tag is seen by a single receiver, two receivers, and three or more receivers, respectively. Preferably, only 3D points are used to provide accurate localization. The locations of a tag are further filtered by a Kalman filter for noise reduction. A constant velocity dynamic model is used and the velocity of the tag is estimated in addition to its position. Most random noises are eliminated without introducing noticeable delay.

Two types of biometric sensors are used in an exemplary system. The first type is based on iris identification. This first type is a standard biometric sensor that requires the subject to stand still within a distance range in front of the sensor and look into a mirror on the sensor in order to be identified. The iris sensor, upon successfully identifying a registered person, sends out information including the person's identity (i.e., enrolled name), a time stamp of the identification, and the ID of the sensor. The sensor's location is known in the overall system. The identification process typically takes a few seconds. The second type is based on face recognition in intensity images. The second type is an on-the-move system where the subject does not need to stop for identification. The face sensor continuously captures images, detects if there are faces in the image, and identifies the person if a face is fond in the image. The face sensor, upon successfully identifying a registered person, sends out information including the person's identity (i.e., enrolled name), the location of the face in the captured image, the time stamp of the image frame that was used for identification, and the ID of the sensor. The camera used in the face identification system is calibrated with respect to the world coordinate system.

Mapping to a Common Coordinate System

Heterogeneous sensors extract different types of information. In order to fuse them, there is a need to find a common feature with which different sensor reports can be compared against each other. Exemplary embodiments use a space-time feature in which the space is defined on the ground plane of the world coordinate system. The basic idea is that if reports from different sensors belong to the same object, their states (i.e., location) and dynamic (i.e., velocity) spatial properties should match each other. The architecture of transforming inputs into a common coordinate system avoids pair-wise calibration, therefore adding and removing sensors becomes easier. The object observation from any sensor at time t is transformed into an observation on the ground plane, denoted as $x_t = [x_t, y_t]^T$. Due to limited sensor accuracy and the ambiguity in the transformation, the uncertainty of the ground observations from different sensors or even the same sensor could be high and inhomogeneous. In order to minimize the ambiguity in fusion, uncertainty analysis is performed. A ground observation is treated as a Gaussian random variable that encodes both the mean and the covariance $N(x, \Sigma)$. Exemplary embodiments include methods for transforming direct measurements and uncertainties from individual sensor in their original forms into the measurements and their uncertainties on the ground plane.

Monocular Camera

Monocular camera trackers report object position in the image coordinate system. There is a need to transform it into a world position. There is an inherent ambiguity going from an image position to a world position. However, the ambiguity is reduced by the knowledge that people move on a known ground plane and their constrained heights. Assume a camera is calibrated with respect to the world coordinate system as $[u, v, 1]^T \sim P \cdot [x, y, z, 1]^T$, where $(x, y, z)$ is the world point and $(u, v)$ is its corresponding image point. People move on a known ground plane. For convenience, assume that the ground plane coincides with the plane defined by $z=0$ in the world coordinate system. Human feet and their ground position are related by a homography $[u_f, v_f, 1]^T \sim H_f \cdot [x, y, 1]^T$, where $H_f = [p_1, p_2, p_4]$ and $p_i$ is the i-th column of the camera projection matrix P. Unfortunately, the feet cannot always be located accurately in images, especially in an indoor environment due to the occlusion of furniture (e.g., table, chairs) and other moving objects. Head position, instead is a relatively stable feature that is not occluded for most of the time. Assuming the physical height of the human, h, is known, the image and ground position of the human head are related by a homography, where $H_h = [p_1, p_2, h^*p_3 + p_4]$. An average human height is used for h=1.68 meters.

The ground position is computed from the image head position:

$$x_m \sim H_h^{-1} \cdot [u_h, v_h, 1]^T \quad (1)$$

Assume the measured image position of the head is a Gaussian random variable $u \sim N(\mu_u, \Sigma_u)$ and the height $h \sim N(\mu_h, \sigma_h^2)$. The uncertainty of the ground position is from the uncertainty in the image position and the uncertainty in height. It is computed by taking the first-order (linear) approximation of the homography $$\sum_m = J_{ux} \cdot \sum_u \cdot J_{ux}^T \cdot J_{hx} \cdot \sigma_h^2 \cdot J_{hx}^T \text{ where} \quad (2)$$

$$J_{ux} = \begin{pmatrix} \frac{dx}{du} & \frac{dx}{dv} \\ \frac{dy}{du} & \frac{dy}{dv} \end{pmatrix} \text{ and } J_{hx} = \begin{pmatrix} \frac{dx}{dz} \\ \frac{dy}{dh} \end{pmatrix}.$$

The covariance matrix of the image position is set according to the size of the human in the image. The standard deviation of the height is set to be 0.15 m. Even though an average height is used for the transformation and humans are of varying heights, the discrepancy is reflected in the uncertainty of the transformed measurement. The singularity of this transformation occurs when the camera height is the same as human height and it looks horizontally. However, this configuration is rare in a surveillance setting. Experiments with cameras mounted from about 2.5 meters to 3.5 meters with a tilt angle ranging from less than about 10 degrees to more than 40 degrees provided reasonable constraint for fusion.

Stereo Camera

A stereo camera tracker is capable of measuring the distance of an object from the camera; therefore, it provides more constraints than a monocular camera tracker. However, the uncertainty of the 3D measurement is not homogeneous in all portions of the image (e.g., objects farther away have more uncertainty in depth than closer ones due to triangulation error). Exemplary embodiments include a stereo tracker that is calibrated with respect to the world coordinate system. 3D points for each image point is computed by, where H is a 4x4 matrix for 3D reconstruction computed in a stereo calibration process and d is the disparity. Therefore, $x_s = [x, y]^T$. For a given ground measurement $(x, y)$ from the stereo tracker, $(u, v, d)$ is recomputed using $(x, y, h/20)$, where h is the average human height. The covariance matrix of its ground position $(x, y)$ is computed as $$\Sigma_s = J_{dx} \cdot \Sigma_{uvd} \cdot J_{dx}^T \quad (3)$$

where $\Sigma_{uvd} = \text{diag}\{\Sigma_u, \sigma_d^2\}$, with $\sigma_d$ being the standard deviation of the disparity error in the stereo matching algorithm and $$J_{dx} = \begin{pmatrix} \frac{dz}{du} & \frac{dx}{dv} & \frac{dx}{dd} \\ \frac{dy}{du} & \frac{dy}{dv} & \frac{dy}{dd} \end{pmatrix}$$

RFID

An RFID localization system provides x-y locations in its local coordinate system that is usually aligned with the ground plane. The position from a RFID local coordinate system is transformed to the world coordinate system through a similarity transformation. The uncertainty associated with the position is usually not exposed from the RF localization system; therefore, they are treated as homogeneous across the covered area. The covariance of the location is computed by averaging the measurement noise covariance matrix at a number of sampled places in the covered area. The ground observation from the RF localization system is a simple form of $N(x_b, \Sigma_{b1})$, where $\Sigma_{b1}$ is the covariance matrix of the ground positions of humans who perform identifications, estimated from a number of samples. Biometric sensors that allow a subject to be moving while performing identification usually have a larger operational range. Therefore, the location is used and the scale of the person in the image (in the case of the face sensor the location and distance between two eyes in the image is used) to further constrain the person's location in the 3D world. The estimated ground position from the head location is the same as for monocular cameras by replacing the head position with eye center position and human height with human eye height. The estimation is denoted $N(x_{bh}, \Sigma_{bh})$. If the locations of both eyes are known, the distance between the eyes in the image provides additional constraint on the ground position by the knowledge of anthropometry (i.e., the distribution of the distance between two eyes of a human). Assuming the image position of two eyes is $e_1=(u_1,v_1)$ and $(u_c,v_c)$, the center of the eye is $e=(e_1+e_2)/2=(u_c,v_c)$. The ray of the center of the eye is $$x = C + \lambda \cdot \Delta \quad (4)$$

where $\Delta$ is the unit vector of the ray.

$$\Delta = \frac{P^+ \cdot e - C}{|P^+ \cdot e - C|}$$

where $P^+ = P^T(PP^T)^{-1}$. Assuming the distance between two physical eyes is $d_e$, and the observed distance between the two image eyes is $d_i$, the distance from the camera center to the center of the eye $l = f \cdot d_e/d_i$. Plugging $l$ as $\lambda$ in equation (4), $$x_{be} = J_{ex} \cdot diag\{\sigma_{de}^2, |e_1-e_2|^2, |e_1-e_2|^2\} \cdot J_{ex}^T \quad (6)$$

where $\sigma_{de}$ is the standard deviation of the distance between the human's two eyes (this also absorbs the out of plane rotation of the two eyes), the uncertainty of the image location of the eyes is set using their image distance and $$J_{ex} = \begin{pmatrix} \frac{dx}{dd_e} & \frac{dx}{du_c} & \frac{dx}{dv_c} \\ \frac{dy}{dd_e} & \frac{dy}{du_c} & \frac{dy}{dv_c} \end{pmatrix}.$$

Combining the measurements by the eye location (using knowledge of eye height) and the eye distances assuming they are independent, a final measurement of the ground position from the face identification sensor is $$x_{b2} = \Sigma_{bh} \cdot (\Sigma_{bh} + \Sigma_{be})^{-1} x_{bh} + \Sigma_{be} \cdot (\Sigma_{bh} + \Sigma_{be})^{-1} x_{be}$$

$$\Sigma_{b2} = \Sigma_{bh} \cdot (\Sigma_{bh} + \Sigma_{be})^{-1} \cdot \Sigma_{be}.$$

Multi-Sensor Fusion

With the information from all sensors transformed into a common coordinate system, fusion is performed. The fusion answers the question which set of observations should be grouped together, or equivalently, whether or not two observations belong to the same object. The compatibility of two observations (e.g., tracks or biometric reports) is measured using the space-time cue. Different observations from the same object should have similar static (i.e., position) and dynamic (i.e., velocity) spatial properties at a given time instant. Due to the noisy input information and the ambiguity of the instant measurements, instead of making a decision at the first frame when a new observation arrives, a delayed decision is made on all the buffered frames to make use of the overlap between sensors. In a real-time system, the decision of the grouping of an observation is made after the period of time since it started. After the decision, the observation is inserted into the object that it belongs to.

At a certain time instant, assume there are n objects $\{O_{k_1}, \ldots, O_{k_n}\}$ where $k_i$ is the global ID of $O_{k_i}$. A special ID, $k_0$, denotes a virtual new object. There are m unresolved observations $\{T_1, \ldots, T_m\}$. A problem is to compute an optimal global ID $d_i \in \{k_0, k_1, \ldots k_n\}$ for each observation $T_i$. Because the sensors may be overlapped, the global ID of different observations is not exclusive, i.e., it is possible that multiple unresolved observations have the same global ID. This excludes the possibility of applying some efficient graph matching algorithm. Due to the large number $((n+1)^m)$ of possibilities of considering the observations jointly, the optimal global ID is computed for each observation independently as the following (the index of the observation $T_i$ is dropped):

$$d^* = \arg\max_{d \in \{k_0, k_1, \ldots, k_n\}} P(d | O_d, T).$$

Assuming a uniform prior on d, $$P(d|O_d,T) \sim P(T|d,O_d) = \{L(T|d,O_d) \text{ if } d \neq k_0, L_e(T) \text{ if } d=k_0\}$$

$L(T|d,O_d)$ is the likelihood of observation T matching object $O_d$ and $L_e(T)$ is the likelihood of observation T being the start of a new object.

Association Using Space-Time Cues

Space-time cues are used to measure the matching of two observations. Because the sensors may have overlap in exemplary embodiments of the system, when a human moves from the coverage of one sensor to the next, there are usually some time instants that the human is visible in both. The ground locations and velocities measured from the two sensors are identical because they are view-independent entities. Due to the different properties of the sensors, the uncertainties of the measures are used carefully for robust fusion. In addition to positions, velocity is used for matching. In fact, matching positions for multiple frames effectively considers the dynamic property of the object. However, using velocity directly has the benefit of being insensitive to some system error (e.g., camera calibration error). Furthermore, a biometric report may also imply some dynamic property (most biometric devices need the subject to stop for an identification) used for discrimination. Exemplary embodiments model the ground state (location and velocity) of an object using a 4-dimensional Gaussian random variable and perform probabilistic analysis to account for the sensor noises and ambiguities. Robust statistics are used to combine the match in multiple frames to reduce the effect of outliers in the sensory data. The matching is performed on the observations from sensors that overlap with or are close to each other. This ensures that no unnecessary comparisons are made. One exemplary embodiment is suitable for a large number of sparsely connect sensors.

Trajectory Estimation

The object trajectory is filtered using a Kalman filter assuming a constant velocity dynamic model for noise reduction and velocity estimation. Making delayed decisions allows the luxury of better velocity estimates using forward-backward filtering (a/k/a Kalman smoother) in the buffer. It avoids the inherent lag of an online filter (the regular forward filter) by combining information from the future measurements. A state is denoted as $x=[x,y,\dot{x},\dot{y}]^T$ where $(x,y)$ is the location and $(\dot{x},\dot{y})$ is the velocity. The covariance matrices are used in Kalman filters. The filtered state is a Gaussian random variable. Besides the estimates at the sample times, the best linear estimate of the state at any time is computed in the Kalman filter framework. Denote $T^{(t)}$ as the best estimate of the state of observation T at time t. Because a biometric sensor only generates one report for each identification, the velocity of the subject cannot be estimated from sensory data. A velocity and its covariance matrix needs to be assigned for each biometric report using prior knowledge related to that specific type or instance of sensor. For example, most biometric sensors require the subject to stop to perform identification; therefore, the velocity can be set to zero with a small uncertainty. For on-the-move devices, the velocities are set to that its direction is facing the sensor and its speed has a relatively flat distribution. Some of the sensors cannot be synchronized accurately. If the sensor outputs continuous tracks, extra uncertainty needs to be added to its position covariance matrix using its estimated velocity. For one-shot sensors (e.g., biometric sensors), the uncertainties of the position of all other sensors are increased using their respective estimated velocities to compensate for this.

Matching Overlapping Tracks

If an observation T has temporal overlap with an object $O=\{T_1, \ldots, T_n\}$ ($T_i$ is the i-th observation belonging to O), the observation T is matched to all the observations $T_i$ in the object that have overlap with T in time and integrate the results. When T is matched to an observation $T_i$, the association likelihood is computed by the similarity of the states of all the time samples of T and the state estimates of $T_i$ at the same time samples during the overlapped interval. There are some outliers in the measurement from some sensors (e.g., outliers from the RFID sensor); therefore, the matching score is integrated at all such time samples using robust statistics.

The similarity of two Gaussian random variables is defined to be their normalized correlation. The normalized correlation $\beta(x_1, x_2)$ of two Gaussian random variables $x_1 = N(u_1, \Sigma_1)$ and $x_2 = N(u_2, \Sigma_2)$ has the following analytical form $$\beta(x_1, x_2) = \frac{\sqrt{2|\Sigma|}}{\left(|\Sigma_1||\Sigma_2|\right)^{\frac{1}{4}}} e^{-\frac{u_1^T \sum_1 u_1 + u_2^T \sum_2 u_2 - u^T \sum u}{2}}$$

where $\Sigma = (\Sigma_1^{-1} + \Sigma_1^{-1})^{-1}$; $u = \Sigma(\Sigma_1^{-1} u_1 + \Sigma_2^{-1} u_2)$. Experiments showed that the normalized correlation is better than simple likelihood evaluation from a Gaussian distribution because it considers both distributions. More specifically, $L(T|d, O_d)$ is computed as the following. For each observation $T_i \epsilon O_d$, a set of time samples $S_i = \{t_j | t_j \epsilon TS(T), t_j \leq e(T_i)\}$ are computed where $TS(\cdot)$ is the set of all time samples of an observation $s(\cdot)$ and $e(\cdot)$ are the starting and ending time of an observation.

$$L(T|d, O_d) = R(\{\beta(T^{(tj)}, T^{(tj)}) | T_i \epsilon O_d, t_j \epsilon S_i\}) \quad (7)$$

where $R(\cdot)$ computes a robust mean that discards a fixed portion of bad matches. The portion is set according to the property of each type of sensor. This approach supports fully asynchronous sensors, sensors dropping frames and sensors working at different frame rates. The multi-frame integration is for sensors that output continuous tracks. For a one-shot sensor, effectively only on matching score is used.

Matching Non-Overlapping Observations

If there is a small gap between sensor overages, observations from two sensors will not appear at the same time instant. Human motion usually shows good continuation during small gaps; therefore, the space-time cues above are still useful for associating slight non-overlapped observations. Much larger gaps between sensors need to be handled by machine learning techniques. If T does not overlap any observation in $O_d$, choose $T_i \epsilon O_d$ that has the latest ending time for matching. If $e(T_i)$ and $s(T)$ are within $\delta T$ (e.g., 1 to 2 seconds), compute the $T_i^{(s(T))}$, the best state estimate of $T_i$ at time $s(T)$ and $T^{(e(T_i))}$, the best state estimate of T at time $e(Ti)$, using Kalman prediction and back-prediction respectively.

$$L(T|d, O_d) = L(T|T_i) = (\beta(T^{(E(T))}, T^{(e(T_i))}) + \beta(T^{(s(T))}, T_i^{(s(T))}))/2$$

Due to the fact that the covariance of the predicted location is larger than the estimation from measurements, the matching score decreases as the gap increases.

Matching with New Objects

The likelihood of an observation being the start of a new object (i.e., $L_e(T)$) is evaluated according to the knowledge of the entrances of the environment. The locations of the entrances are well defined for each sensor; there is usually a preferred direction for each entrance. The location and velocity of the start of an object is modeled as a mixture distribution $$P_e(x) = \sum_{i=1}^{n_e} l_i N(u_i, E_i) + l_0 U(\Omega)$$

where $u_i$ is the mean location/velocity of an entrance, $\Sigma_i$ is the associated uncertainty, $I_i$ reflects how often an entrance is used. The uniform component defined on the entire domain $\Omega$ captures other possibilities. The parameters are hand crafted in one embodiment, but in another embodiment they are learned from observations. The starting state $T^{(s(T))}$ of an observation is matched with the entrance distribution by combining the normalized correlation with each component in the mixture model using the component ownerships.

Figure 3:
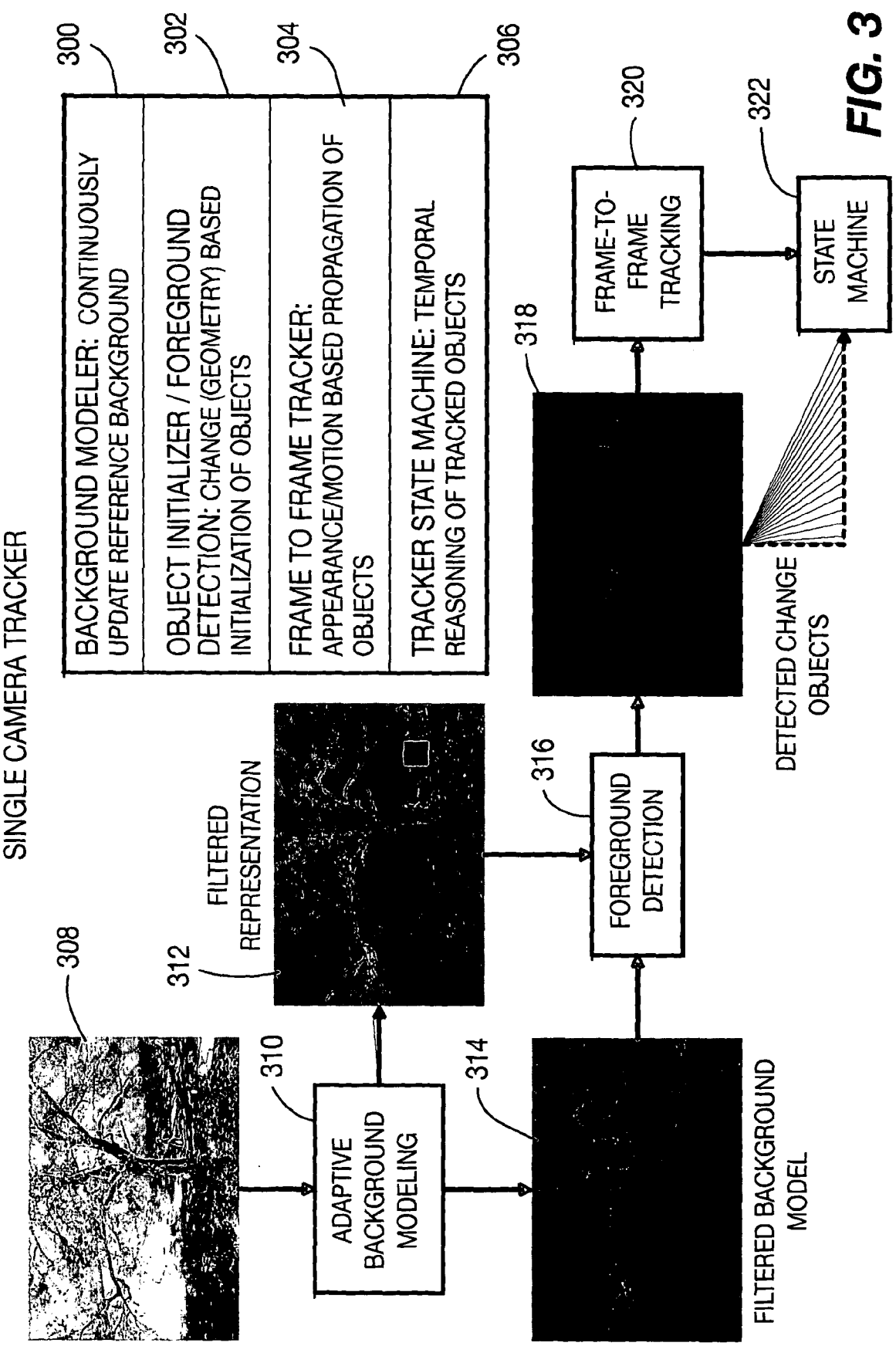
FIG. 3 is an illustration of an exemplary monocular single camera tracker.

FIG. 3 illustrates an exemplary monocular single camera tracker. There is a background modeler 300 that continuously updates the reference background, an object initializer/foreground detection component 302 that performs change (geometry)-based initialization of objects, a frame-to-frame tracker 304 that performs appearance/motion-based propagation of objects, and a tracker state machine 306 that performs temporal reasoning of tracked objects. In the illustration, a scene 308 is processed by an adaptive background modeling process 310 to produce a filtered representation 312 and a filtered background model 314. Then, a foreground detection process 316 generates a foreground representation 318 using the filtered representation 312 and the filtered background model. A frame-to-frame tracking process 320 uses the foreground representation 318 and detected change objects to generate a state machine 322.

In one exemplary embodiment, a layer-based formulation is used for single camera tracking. Single camera processing includes stereo computation, appearance-depth based change detection, ground-based human segmentation, and a multi-object tracker. The multi-object tracker includes motion estimation, computing likelihood, computing ownership, and updating a model. A semi-3D object representation encodes the object's ground position and uncertainty, 2D shape and appearance. Visually, an object can be thought of as a 2D cardboard cutout placed vertically on a ground plane with probabilistic shape and a part-based histogram appearance model. One advantage of a ground-based representation of shape and appearance is that it provides invariance to image scale change due to perspective effects. Further the appearance and depth models are designed to be resilient to pose variations and suitable for articulated objects.

Figure 4:
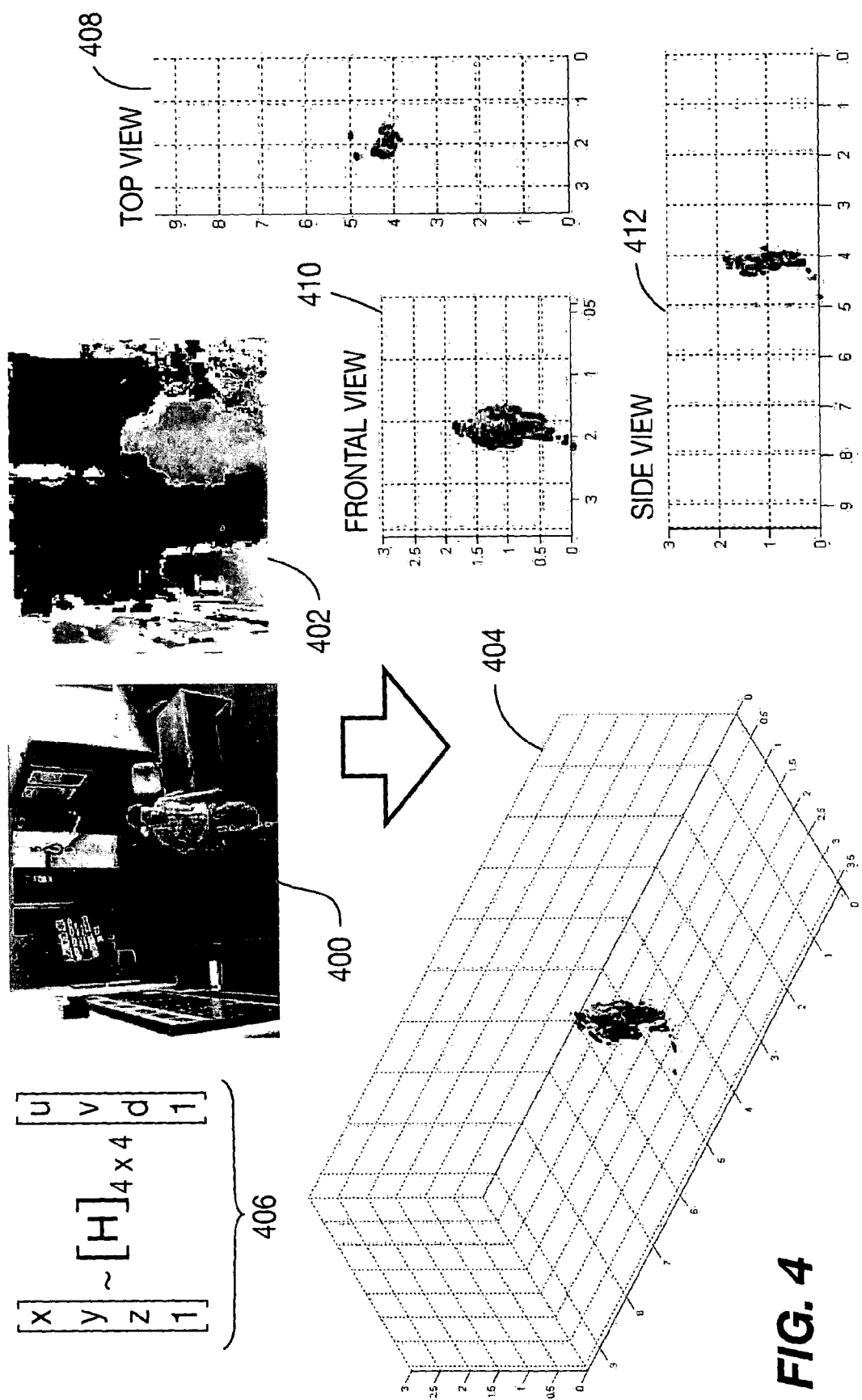
FIG. 4 is an illustration of an exemplary process for 3D reconstruction of objects.

FIG. 4 illustrates an exemplary process for 3D reconstruction of objects. For stereo tracking, disparities 402 are first estimated between the corresponding stereo pairs for a video frame 400. The disparities 402 are converted into an Euclidean (x,y,z) representation 404 using a 4×4 calibration matrix 406 as illustrated in FIG. 4. The top view 408, frontal view 410, and side view 412 of the Euclidean (x,y,z) representation 404 are also illustrated. The tracking is performed after coherent blobs are detected in the computed Euclidean representation 404. The blobs are projected vertically down on the ground plan, creating xy blobs that are fairly well separated because of their separation in depth. This is shown in FIG. 5.

Object representation needs to be rich and discriminative so that an object can be distinguished from other objects and the background. At the same time, object representation also needs to be flexible to take into account the change of object properties over time. In one embodiment, integrated position, shape, appearance and depth cues are used. Compared to stereo tracking methods that use depth alone, integrating multiple cues provides more robustness in crowded environments. A non-parametric probabilistic shape model is maintained for each object over time. A flexible appearance model includes a coarse cardboard grid and a color histogram of appearance is maintained for each grid pixel over time. The human ground location is represented by a center location and the ground speed of a typical human and location error covariance, which varies by the distance from the camera according to the stereo reconstruction. Depth information is provided by stereo computation and used to distinguish objects in an image.

Figure 5:
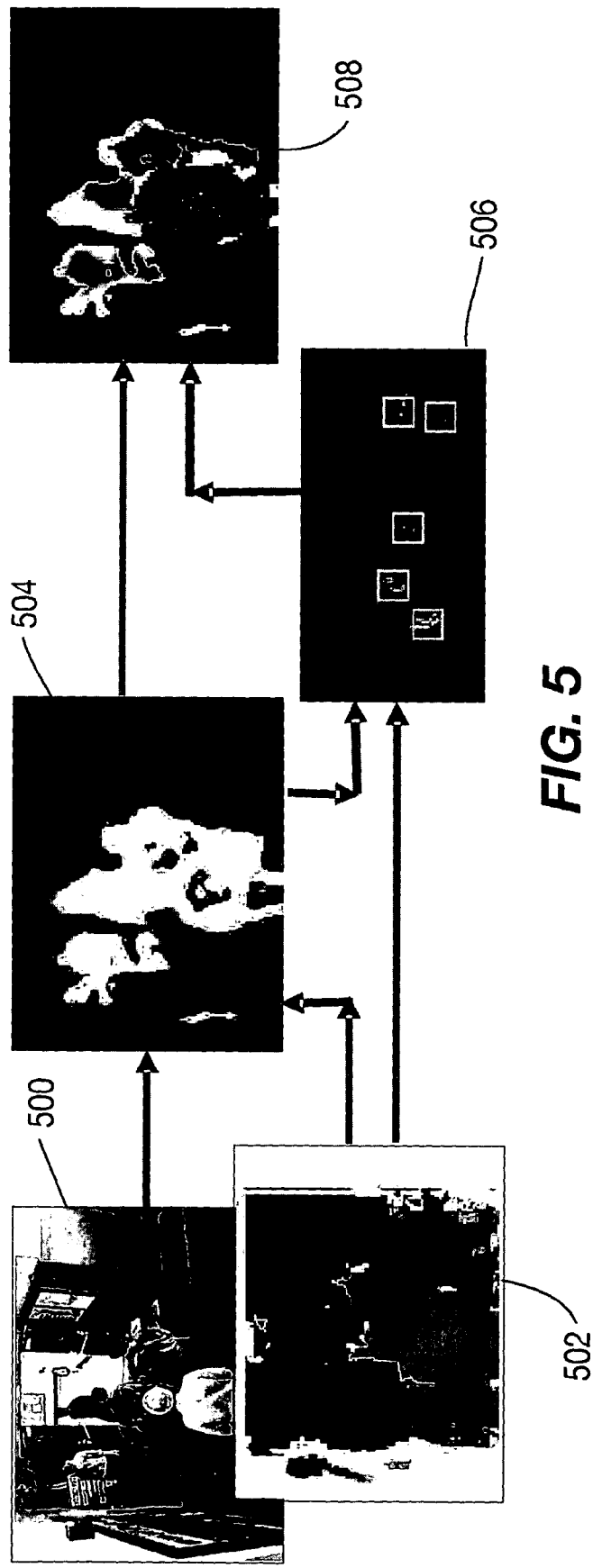
FIG. 5 is an illustration of an exemplary process for ground-based stereo tracking.

FIG. 5 illustrates an exemplary process for ground-based stereo tracking. FIG. 5 shows an example input frame 500, detected background 502, detected foreground 504, a ground accumulation map 506 and the detected humans 508, and the segmentation. The noise in the foreground detection is due to the stereo artifact and shadow that have been excluded from the detection. The foreground is projected onto the ground plane. This results in the good separation for vertical elongated objects, such as humans. Object segmentation is based on a ground accumulation map. Object segmentation involves knowledge of the physical size of humans and is capable of segmenting humans that are close to one another. A ground plane-based region of interest is specified.

A histogram based background model is built and updated over time at each pixel for both the appearance and depth, preferably insensitive to illumination change. The pixels that are dissimilar to the background model are classified as foreground. A fast object segmentation technique based on an efficient mode-seeking algorithm (mean shift) on the foreground ground accumulation map, which is constructed by projecting the 3D points of the foreground onto a quantized ground grid. Local peaks are identified on the map. A few iterations of the mean shift algorithm starting from these seed points using a circular kernel whose size is approximately the size of a person. The resulting modes are merged if their distance is smaller than half of the human width. A threshold on the accumulation map (number of image pixels that contribute to the mode) is applied to separate true human detections from any extraneous noise in depth maps. The thresholds at different locations are different and are set according to the expected image size of a human by the camera geometry. This method is powerful in segmenting multiple people close to one another, which is almost impossible with either monocular analysis or image-based depth analysis. After the tracking process, a matching process is invoked to detect objects.

Figure 6:
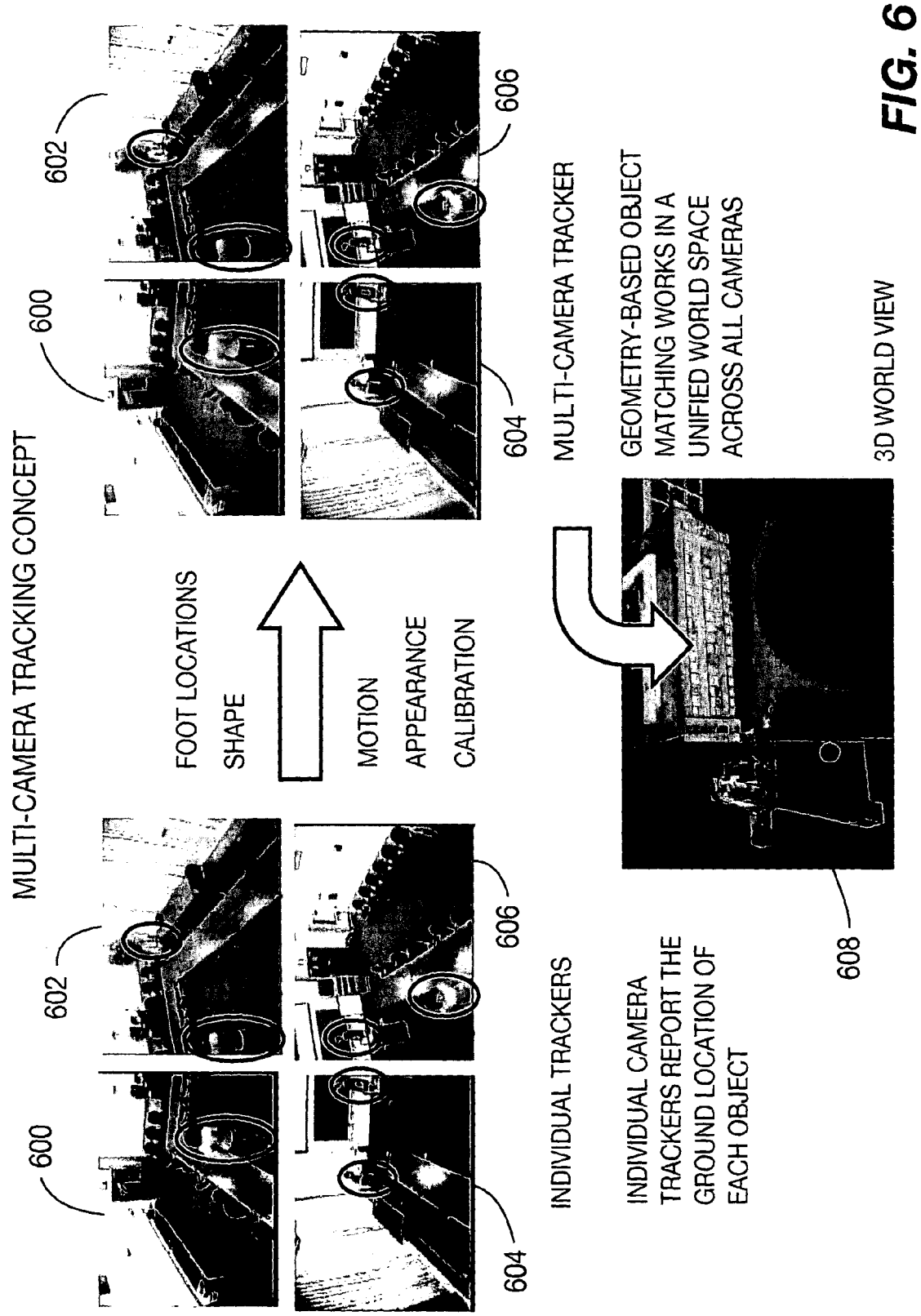
FIG. 6 is an illustration of a multi-camera tracking concept.

FIG. 6 illustrates a multi-camera tracking concept. A room has four cameras, each camera having a different view 600, 602, 604, 606, which are combined into a 3D world view 608. Individual trackers identified various people, as indicated with circles. The individual camera trackers report the ground location of each object. Various measurements, such as foot locations, shape, motion, appearance, and calibration are determined. A multi-camera tracker using geometry-based object matching works in a unified world space across all the cameras.

Single camera stereo/monocular tracking is extended to multi-camera tracking, where the multiple cameras have minimal overlap. The following constraints are used in multi-camera tracking: foot location, shape, appearance, motion, and camera-to-camera calibration. When cameras have some overlap, the fact that the head location for the same person lies within a plane is exploited using a homography between pairs of cameras. The homography is pre-computed by choosing head locations in images for individuals with nominal heights. Uncertainties due to varying heights with online tracking is modeled and used for tracking. There is an exemplary head-to-head homography constraint between overlapping cameras. Head locations are represented using a nominal position and its covariance resulting from measurement uncertainties within an image and the variation in heights of people. In multi-camera tracking systems, there is an exemplary representation of head position. Head position is represented by a mean and an uncertainty measure (e.g., covariance matrix). Uncertainties in head position include a measurement error in estimating head position and a height variation among different people compared to mean height used for the geometry constraint.

In one embodiment, multi-object tracking is formulated as a mixture model estimation problem. The image observation (i.e., appearance and depth) is modeled as a mixture model with one component for each object layer and one component for the background layer. Multi-object tracking includes motion estimation using the EM algorithm, updating shape and appearance models using IIR filtering weighted by layer ownerships, and updating the depth model using Kalman filtering.

In one exemplary embodiment, an area is monitored with a network of stereo cameras. Stereo cameras can reliably handle groups of people in a cluttered environment. Each pair of adjacent cameras has a slight overlap in the field of view. This overlap ensures a tight inter-camera space time constraint. Object detection and tracking are performed independently for each stereo camera. Tracking results from all single (stereo) camera trackers are sent to the multi-camera tracker (McTracker). The McTracker resolves local tracks from all cameras that correspond to the same object into one global track so that the identity of an object is carried across camera views. The resolved global tracks are stored in a database. A visualization tool and an event query engine are tied to the database. Objects are detected using a fast mode-seeking approach on the ground plane projection of foreground pixels. Objects are then tracked using a representation of shape, appearance and ground-based depth. The tracking problem is formulated in a unified mixture model framework and solved using an expectation maximization (EM) algorithm. The EM algorithm iteratively estimates the object ownership and motion parameters. Ground-based space-time cues are used to match different tracks of an object as it moves from one camera to another. The object state (i.e., ground location and velocity) is modeled as a Gaussian variable and estimated using a Kalman forward/backward filter (i.e., smoother). The estimated states are matched across overlapped tracks stored in a decision buffer and matched across slightly non-overlapping tracks using extrapolation.

Figure 7:
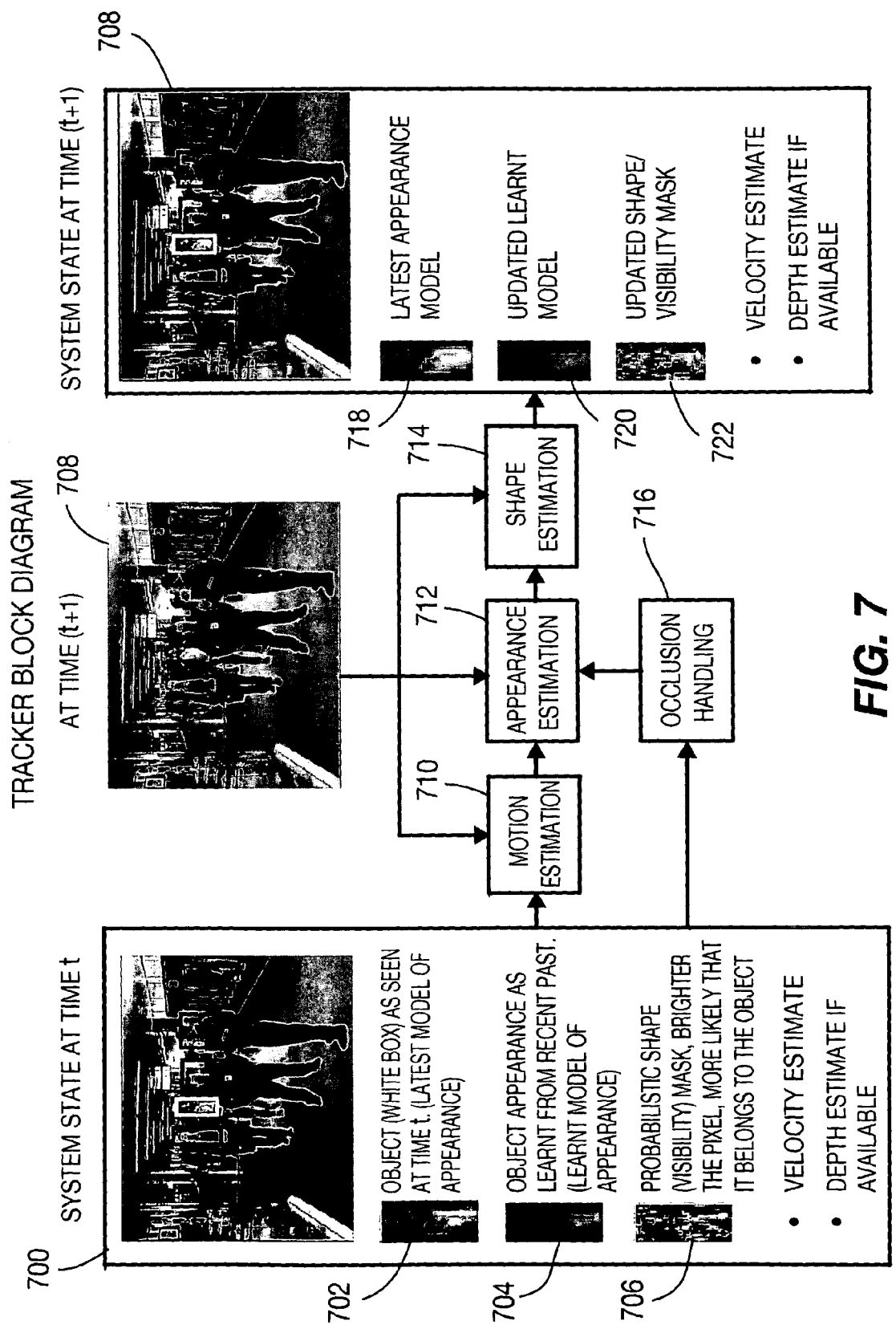
FIG. 7 is a flow chart illustrating an exemplary process of tracking.

FIG. 7 illustrates an exemplary process of tracking. At time t 700, an object 702 is identified and associated with an icon of the latest model of appearance 704, which was learned from the recent past. In a probabilistic shape (visibility) mask 706, the brighter the pixel, the more likely that it belongs to the object. An object is associated with a velocity estimate and a depth estimate if available. At time t+1 708, motion estimation 710, appearance estimation 712, shape estimation 714 and occlusion handling 716 are performed to provide a latest appearance model 718, an updated learned model 720, updated shape or visibility mask 722, and updated velocity estimates and depth estimates.

Figure 8:
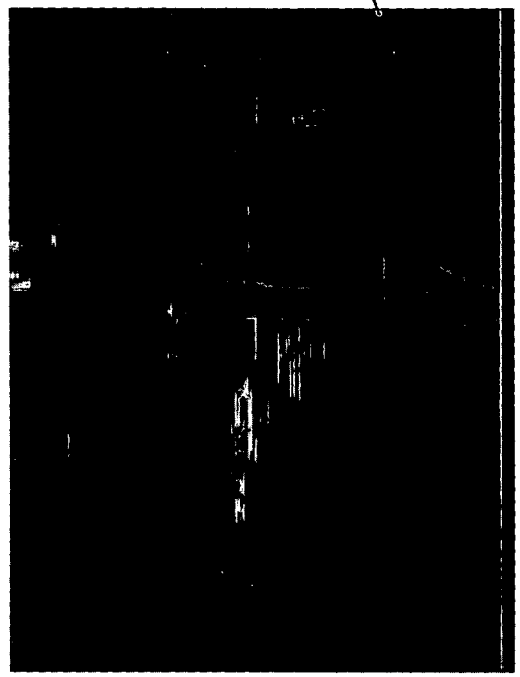
FIG. 8 is an illustration of exemplary tracking video.
Figure 8:
Figure 8:
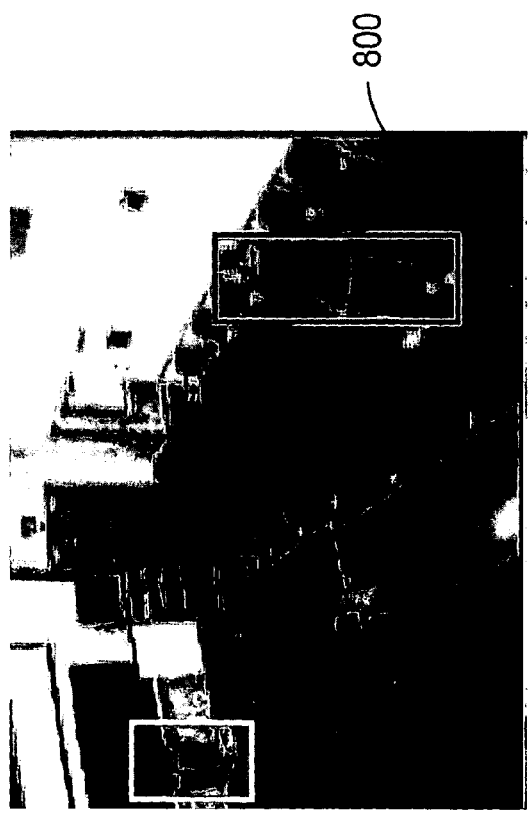
Figure 8:

FIG. 8 illustrates exemplary tracking video. Exemplary embodiments may be used in various different environments, such as a conference room in an office building 800, an outdoor park 802, a public building 804, and an entrance way to a building 806.

Figure 9:
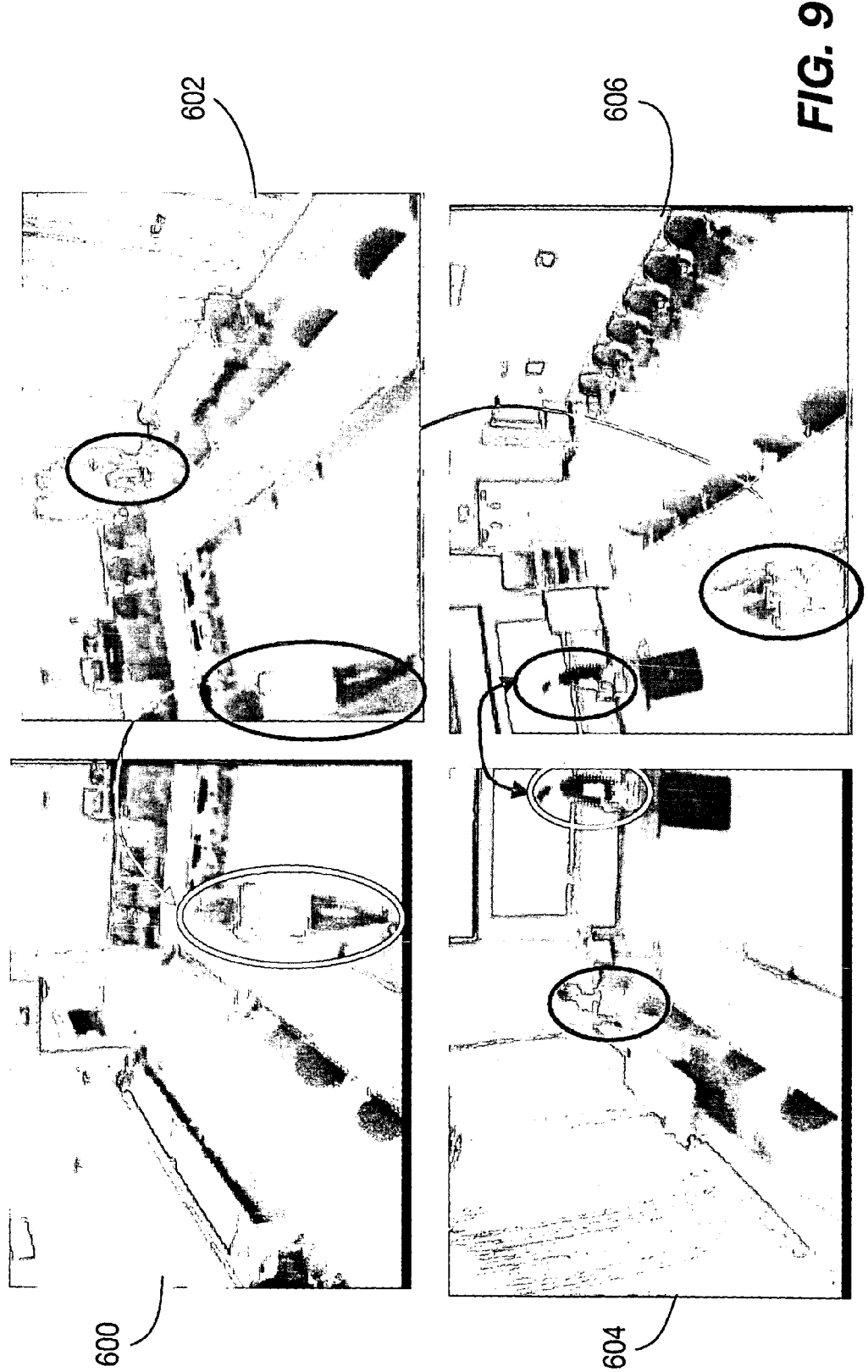
FIGS. 9 and 10 are illustrations of exemplary multi-camera tracking video.
Figure 10:
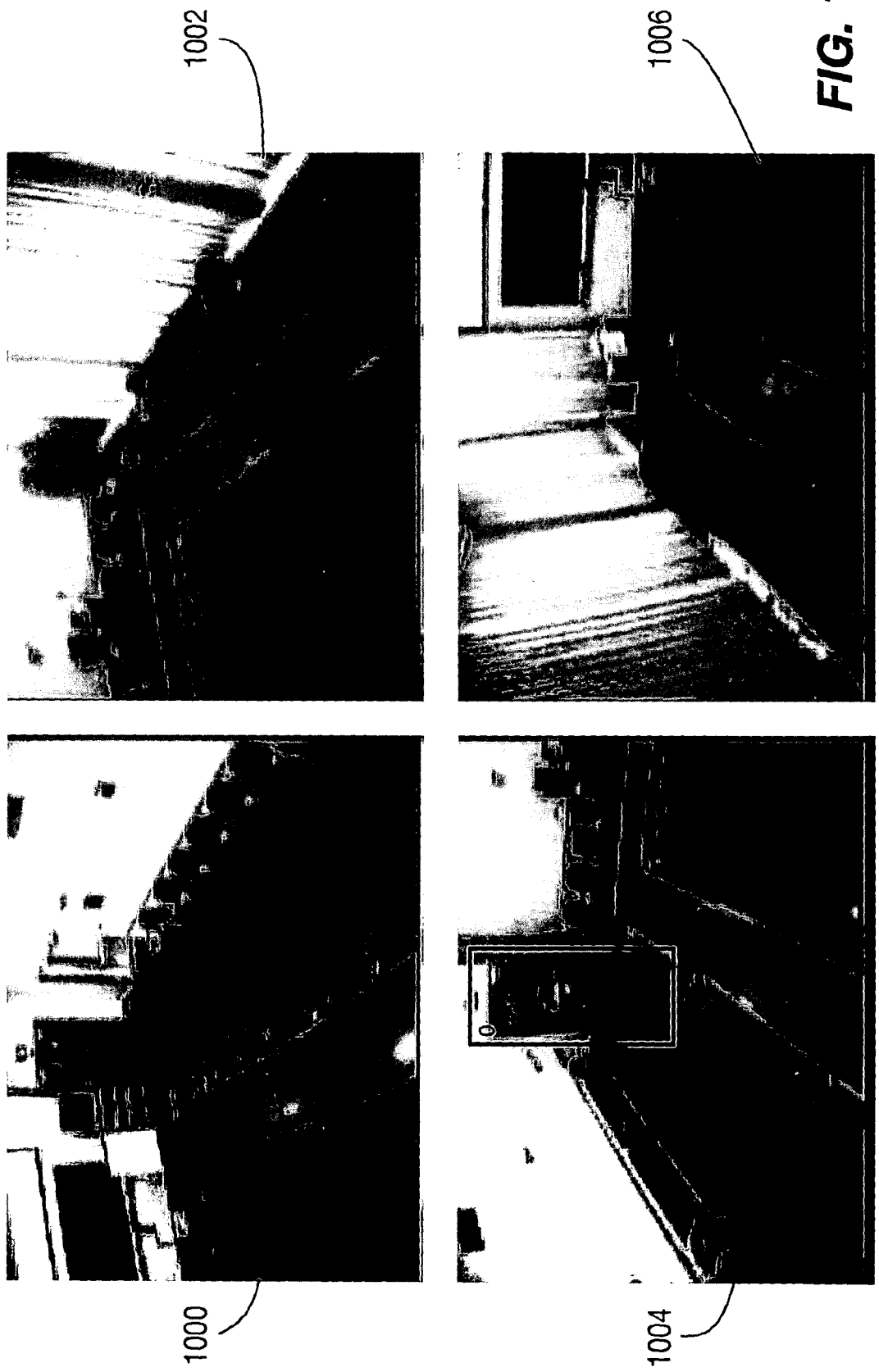

FIGS. 9 and 10 illustrate exemplary multi-camera tracking video. With multi-camera tracking for video only as shown in FIG. 9, a global set of identities for all the objects in the environment is maintained. Available cues, such as position, motion, shape, and appearance are used to match object identities across multiple cameras, each of which is tracking individually. FIG. 10 shows overlapping camera views 1000, 1002, 1004, 1006 of a room.

There is an exemplary process of matching two corresponding head locations between two cameras, which is accomplished using uncertainties. Given head measurement noise and height uncertainty in a first camera, use the Jacobian of the transformation between the first camera and other cameras to evaluate the corresponding uncertainty in the other cameras. Then, use the warped uncertainty to evaluate a matching score between a new person tracked by the first camera with those being currently tracked in other cameras. The track with the best matching score is selected.

FIG. 10 illustrates how objects in various locations across different pairs of cameras have widely heterogeneous uncertainties, thus, illustrating that the use of these uncertainties is needed for finding correct matches in cluttered scenarios.

Furthermore, shape and appearance constraints are also used to track objects from camera-to-camera. These constraints enable multi-camera tracking even when there is no overlap between the cameras. Because humans largely walk upright, appearance is represented as a collection of histograms of color/intensity/texture at different heights along the height axis of a person. This is typically a multi-dimensional representation. In particular for intensity, it is two-dimensional. One dimension is the height with respect to the ground and the other axis is the binned intensities with each bin containing the strength for that intensity. This is generalized to use color and texture histograms as well. The shape and appearance representation is correlated among potentially matching hypotheses to derive a unique object association across cameras. Furthermore, this association is computed over many overlapping time instants across two cameras in order to provide robustness to accidental matches, as illustrated in FIG. 11.

Figure 11:
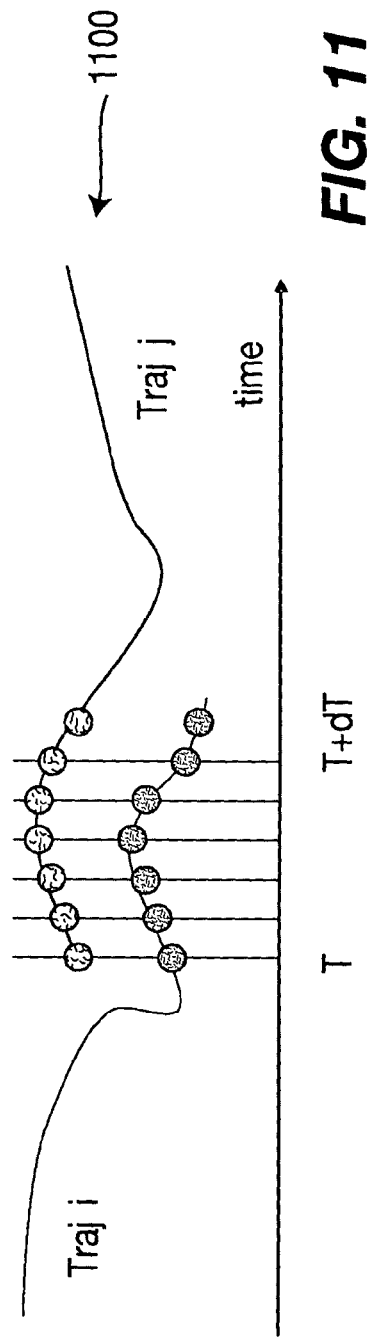
FIG. 11 is an illustration of an exemplary process of matching feature trajectories.

FIG. 11 illustrates an exemplary process of matching feature trajectories 1100. Object coordinates and the error covariances from RF and video are mapped to a common coordinate system. The warped uncertainties are used to evaluate a matching score between a video-based and a RF track. Multiple frames with overlap in time are used for decisions on whether to combine matching scores from multiple overlapping times, which is a more robust decision than only using a single frame.

Figure 12:
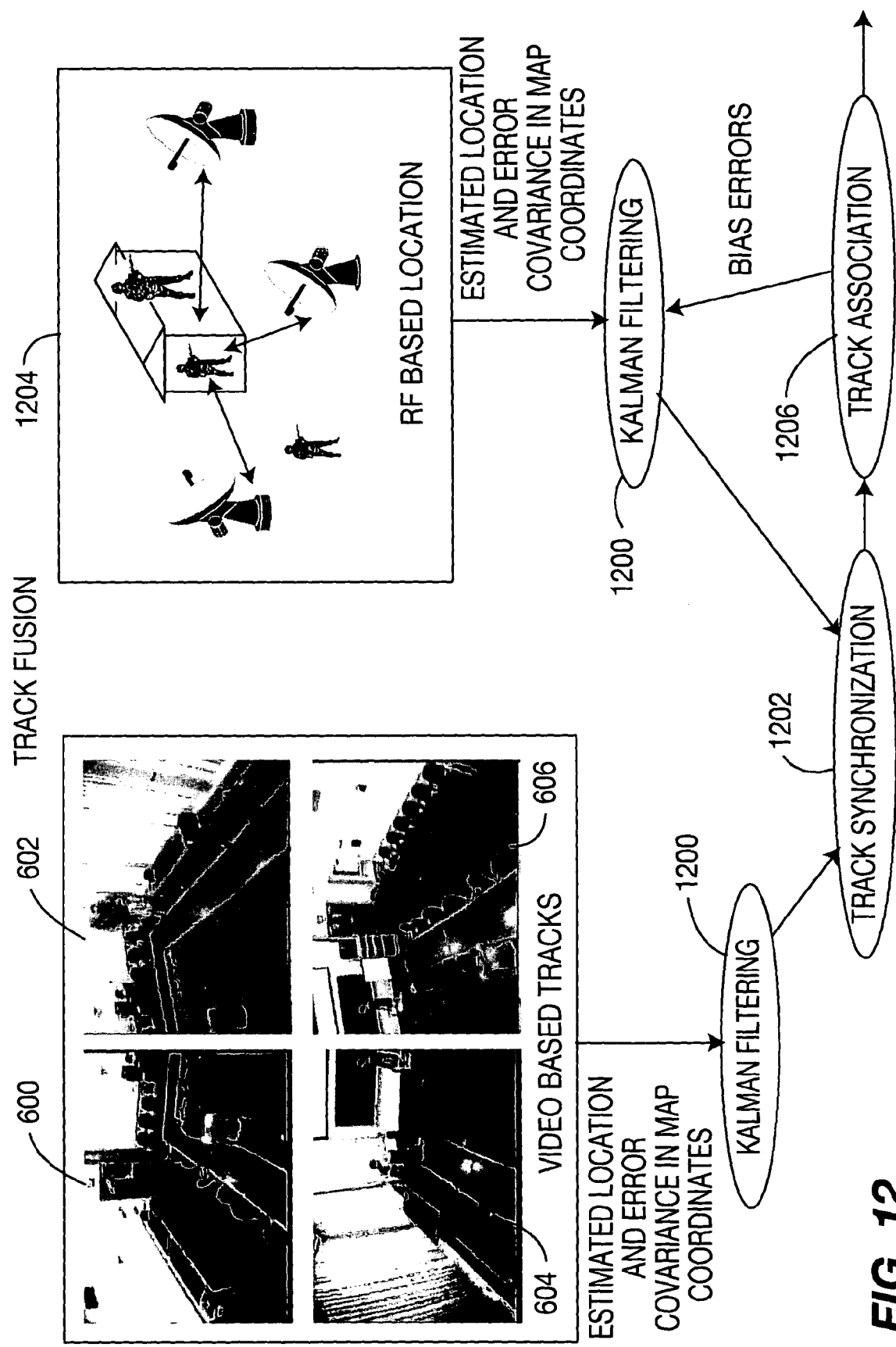
FIG. 12 is a flow chart illustrating an exemplary process of track fusion using Kalman filtering.

FIG. 12 illustrates an exemplary process of track fusion using Kalman filtering. Video based tracks 600, 602, 604, 606 are processed to estimate location and error covariance in map coordinates. Kalman filtering 1200 and track synchronization 1202 are performed on the video based tracks 600, 602, 604, 606. An RFID and location system 1204 determines RF-based location that is processed to estimate location and error covariance in map coordinates. Kalman filtering 1200 is performed on the RF-based location and track synchronization 1202 is performed. Video based tracks 600, 602, 604, 606 and RF-based location is processed by track association 1206 and bias errors are determined. In exemplary embodiments, tracking includes RF tags to provide 2D/3D location information as well as a unique ID for the individual carrying the tag. The unique ID provided by RF is fused with the locations provided by RF and video based tracking to compute joint RF/video tracks. RF provides positive identification and rough location, while video provides precise location but is affected by clutter. Thus, exemplary embodiments combine the advantages of both while mitigating their drawbacks.

Exemplary embodiments include a unified approach to fuse multiple heterogeneous sensors including a monocular video tracker, a stereo video tracker, a RF localization system, and two types of biometric identification systems. The underlying technique is to transform observations from all sensors into a common ground plane based coordinate system with rigorous uncertainty analysis. Observations from different sensors are then fused using space-time constraints. The resulting capabilities include continuous tracking of people in a mixed monocular and stereo camera network, associating video tracks with RF tracks, tracking of people with their identities, and others. The capabilities provide information from different sources into a compact and consistent form that is natural for the system operator. The capabilities also enable many interesting applications, such as wide-area event recognition, analysis of individual behavior patterns and selective video-based alarms.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for tracking an object, comprising:
receiving, by a plurality of camera trackers, camera video streams from a plurality of cameras;
providing, by the camera trackers, camera video tracks;
providing, by at least one radio frequency identification (RFID) and localization system, RF tracks and a plurality of RF identities;
selectively fusing, by a fusion module, at least one of two camera video tracks and a camera video track to an RF track to generate at least one fused track, wherein the fusing is performed by matching tracks using association of space-time and appearance cues, and wherein the appearance cues include shape and appearance;
associating, by the fusion module, the at least one fused track with the RF identities;
displaying, by a visualization display, the at least one fused track and the RF identities; and
providing time-synchronized access to the camera video tracks, by the visualization display.

2. The method of claim 1, wherein the camera video tracks are overlapping.

3. The method of claim 1, wherein the camera video tracks are non-overlapping.

4. The method of claim 1, wherein the fusing includes matching camera video tracks with new objects.

5. The method of claim 1, wherein the camera video tracks are from monocular cameras, stereo cameras, or any combination thereof.

6. The method of claim 1, wherein continuous coverage is provided by propagating the RF identities and by performing handoffs between any two cameras.

7. The method of claim 1, wherein the fusion module selectively associates a plurality of identities from at least one biometric system with the at least one fused track.

8. A system for tracking an object, comprising:
a plurality of camera trackers to receive camera video streams from a plurality of cameras and to provide camera video tracks;
at least one radio frequency identification (RFID) and localization system to provide RF tracks and a plurality of RF identities;
a fusion module to selectively fuse at least one of two camera video tracks and a camera video track to an RF track to generate at least one fused track, wherein the fusing is performed by matching tracks using association of space-time and appearance cues, and wherein the appearance cues include shape and appearance; and
a visualization display to display the at least one fused track and the RF identities and to provide access to the camera video tracks.

9. The system of claim 8, wherein the camera video tracks are overlapping.

10. The system of claim 8, wherein the camera video tracks are non-overlapping.

11. The system of claim 8, wherein the fusing includes matching camera video tracks with new objects.

12. The system of claim 8, wherein the camera video tracks are from monocular cameras, stereo cameras, or any combination thereof.

13. The system of claim 8, wherein continuous coverage is provided by propagating the RF identities and by performing handoffs between any two of: the cameras and the RFID and localization system.

14. The system of claim 8, further comprising: at least one biometric system to provide a plurality of identities; wherein the fusion module selectively associates the identities with the at least one fused track tracks.

15. A non-transitory computer readable storage medium having stored thereon instructions for performing a method for tracking an object, the method comprising:
receiving, by a plurality of camera trackers, camera video streams from a plurality of cameras;
providing, by the camera trackers, camera video tracks;
providing, by at least one radio frequency identification (RFID) and localization system, RF tracks and a plurality of RF identities;
selectively fusing, by a fusion module, the at least one of two camera video tracks and a camera video track to an RF track to generate at least one fused track, wherein the fusing is performed by matching tracks using association of space-time and appearance cues, and wherein the appearance cues include shape and appearance;
associating, by the fusion module, the at least one fused track with the RF identities;
displaying, by a visualization display, the at least one fused track and the RF identities; and
providing access to the camera video tracks, by the visualization display.

16. The computer readable medium of claim 15, wherein the camera video tracks are overlapping.

17. The computer readable medium of claim 15, wherein the camera video tracks are non-overlapping.

18. The computer readable medium of claim 15, wherein the fusing includes matching camera video tracks with new objects.

19. The computer readable medium of claim 15, wherein the camera video tracks are from monocular cameras, stereo cameras, or any combination thereof.

20. The computer readable medium of claim 15, wherein continuous coverage is provided by propagating the RF identities and by performing handoffs between any two of: the cameras and the RFID and localization system.

* * * * *